Sept. 27, 1955     D. G. SCORGIE     2,719,260
VOLTAGE-CONTROLLED AC GENERATOR SYSTEM
Filed May 29, 1953
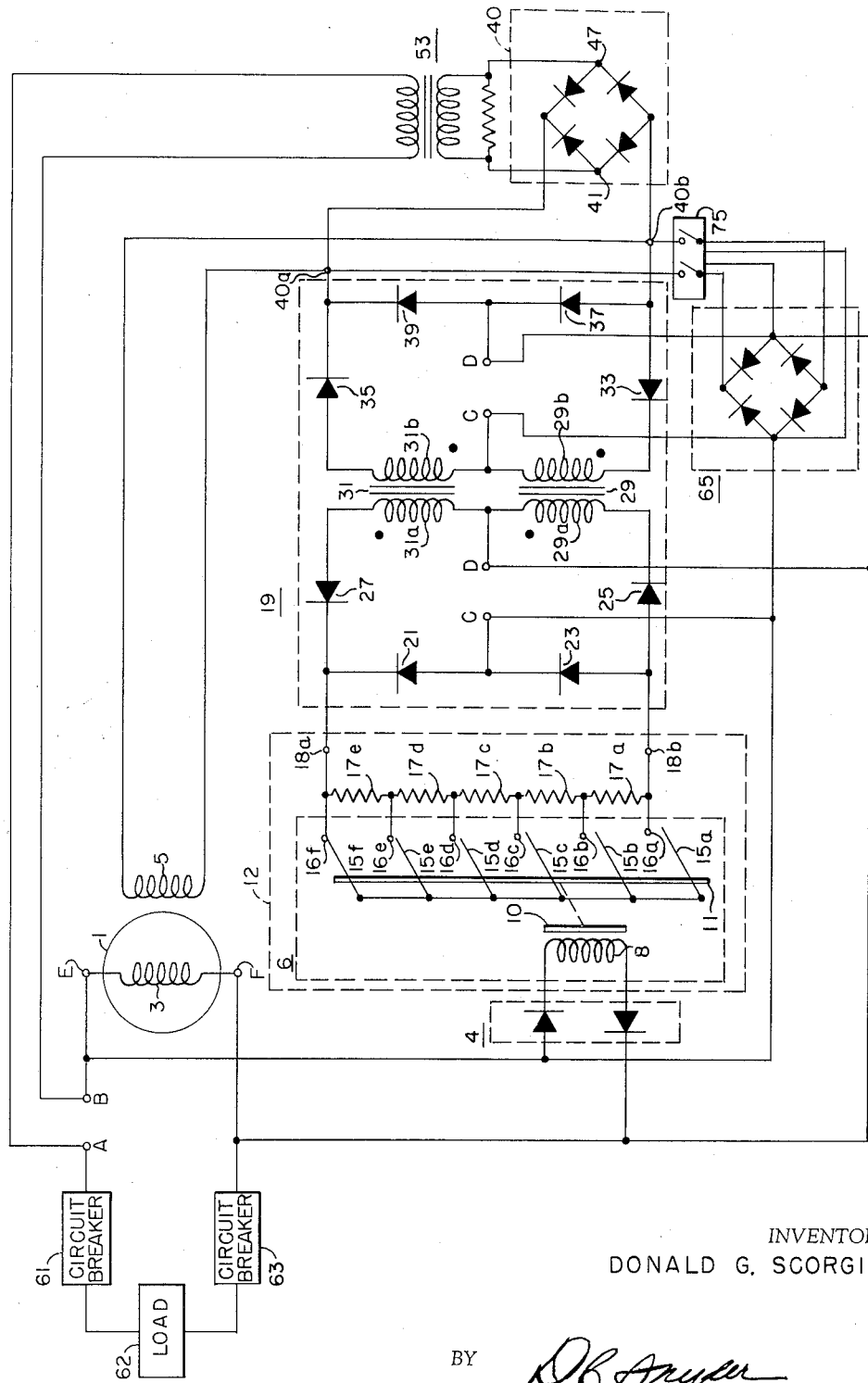
INVENTOR
DONALD G. SCORGIE
BY
ATTORNEYS United States Patent Office 2,719,260
Patented Sept. 27, 1955

2,719,260

VOLTAGE-CONTROLLED A. C. GENERATOR SYSTEM

Donald G. Scorgie, Forestville, Md.

Application May 29, 1953, Serial No. 358,579

9 Claims. (Cl. 322—25)

(Granted under Title 35, U. S. Code (1952), sec. 266)

This invention relates to A. C. generator systems, and more particularly to improvements in voltage regulating devices for A. C. generator systems.

A common type of voltage regulator that has found wide acceptance utilizes a carbon-pile variable resistance element to control the current through the shunt field of a D. C. exciter, which in turn supplies field current to an alternator, or A. C. generator. The resistance of the carbon-pile is increased or decreased by varying the pressure on the pile exerted by the movable core of an electromagnet actuated by current derived through a rectifier from the load terminals of the A. C. generator. In more particular, when the output voltage of the generator increases, the movable armature exerts less pressure on the carbon-pile and increases the electrical resistance thereof. Thereupon the field current and output voltage of the exciter are decreased, thereby reducing the field current of the alternator. The output voltage of the alternator is decreased and a new cycle of events is begun, the electromagnet exerting more pressure on the pile, thereby increasing the exciter field current, the alternator field current and the generated voltage of the alternator. Inasmuch as the moving elements of such a system have considerable electrical and mechanical inertia, a cyclic variation of the peak generated voltage is produced, the peak output voltage of the A. C. generator varying at the rate of about 3 C. P. S. in a typical system.

When a sudden fault or short circuit is placed across the load terminals of an alternator having a regulator of the type described above, it has been found that protective circuit breakers in the system remain closed and that the voltage of the system fails to rise after the fault is removed. The reason for this situation is that the short circuit produces a transient voltage pulse in the generator field, which pulse is polarized oppositely to the voltage supplied by the shunt-connected exciter; the result is often a polarity reversal at the terminals of the exciter that may result in the exciter field being oppositely magnetized so as to reverse the phase of the output voltage and to bring about instability in those systems utilizing feedback stabilizing networks.

It has been found also that the electrical and mechanical inertia of the carbon-pile element, the D. C. exciter unit and the A. C. generator field connected in cascade lead to time delays sufficient to produce extreme instability or oscillations. A more detailed treatment of the problems indicated above may be found in the article "Exciter polarity reversals in voltage regulated aircraft alternators," by R. P. Judkins and H. M. McConnell, appearing in Aiee Transactions, volume 71, page 1.

In addition to the shortcomings of the carbon-pile regulator discussed above, the carbon-pile element must dissipate a great amount of power, and for that reason it disintegrates at a relatively rapid rate. Typically, the carbon-pile, which is the least reliable element in the regulator, absorbs 150 watts of power, while all of the other elements combined absorb only 15 or 20 watts.

Among the objects and features of the present invention are the following:

One object of this invention is to provide a voltage regulating system that will remain stable under varying load conditions.

Another object of this invention is to provide a voltage regulating system having low electrical and mechanical inertia and rapid response to load voltage variations.

A further object of the invention is to provide a voltage regulating system wherein power will be absorbed by those component elements most capable of absorbing power over prolonged periods of time.

A still further object is to provide an A. C. generator system wherein the generator field current may be supplied by the generator itself.

Still another object is to provide an A. C. generator system capable of providing current sufficient to actuate protective devices under high transient short circuit conditions.

Yet another object is to provide an A. C. voltage regulator system having light-weight, fast-acting moving parts.

Other objects and features of the present invention will become apparent upon consideration of the following detailed description when taken in connection with the single figure of the accompanying drawing which illustrates a preferred embodiment of the invention. It is to be expressly understood, however, that the drawing is designed for purposes of illustration only and not as a definition of the limits of the invention, reference for the latter purpose being had to the appended claims.

Briefly, the present invention provides a system for stabilizing the field excitation and therefore the output voltage of an A. C. generator by feeding the output voltage of the generator through a magnetic amplifier to the generator field. The output voltage from the magnetic amplifier is determined by the setting of a control resistance element located in the control circuit of the amplifier and this resistance is automatically varied in response to the alternator voltage output magnitude of the generator.

In more particular, the control resistor is varied by an electromagnetically actuated, finger-type, shorting unit arranged to progressively short a plurality of resistance units which may be either series or parallel connected across the input terminals of the magnetic amplifier in response to variations in the output of the A. C. generator. Specifically the shorting unit is so actuated by the load voltage of the generator as to decrease the resistance input to the magnetic amplifier with increase of load voltage. This action decreases the output voltage of the magnetic amplifier and the field current of the generator, thereby lowering the output voltage of the generator. The only moving element of this regulator system (exclusive of the alternator) is the shorting unit, which may be a very light-weight assembly having small electrical and mechanical inertia.

In addition to the foregoing there is also provided by the present invention a means for maintaining sufficient A. C. generator output voltage and current to actuate protective load devices. This feature is accomplished by sampling the current delivered to the load and feeding back to the field winding of the generator a suitable excitation voltage whenever the load current becomes excessive such as is occasioned by a short circuiting load placed on the generator.

With reference now to the single figure, there is shown one embodiment of my invention. Reference numeral 1 refers to a conventional single-phase alternator having an armature winding 3 and field coil 5. To build up the small starting voltage produced by residual field flux, a feedback loop is inserted between armature terminals E–F and field coil 5. This feedback loop includes a bridge rectifier 65 which receives its input from across the output terminals E and F of the alternator and delivers its rectified output through a conventional voltage responsive circuit breaker 75 to the alternator field coil 5. The function of circuit breaker 75 is to disconnect the output of rectifier 65 from field coil 5 when the voltage across terminals E—F has reached a given value. The elements of the bridge rectifier 65 are preferably germanium rectifiers or like units having a very small forward resistance.

In parallel with the above described starting-voltage feedback loop is a second feedback loop operative to maintain the output voltage at a given value under normal operating conditions. This running-voltage feedback loop includes a magnetic amplifier 19 which receives its excitation from the output terminals E—F of the alternator and delivers its output to the field coil 5 of the alternator 1 in parallel with the output from the starting-voltage feedback loop. The power output of the magnetic amplifier is controlled by a variable resistance device 12 which in turn automatically varies in response to the variation in terminal voltage of the alternator 1 by means of the solenoid 8. Magnetic amplifier 19 is preferably of the type described in the article "On the mechanics of magnetic amplifier operation" by R. A. Ramey, Jr., appearing in Transactions of the AIEE, volume 70, part II, pages 1214–1223. In the parallel-connected version of this type of amplifier that is shown in the figure and shown and described in the article by R. A. Ramey at page 1220, use is made of a pair of high remanence, saturable cores 29 and 31 on which are respectively wound control windings 29a and 31a, and load windings 29b and 31b. The alternating voltage across terminals E—F is applied through a bridge rectifier including rectifier elements 21, 23, 25 and 27 to the control windings 29a and 31a. Control winding 29a is inserted in the rectifier leg including element 25 and control winding 31a is inserted in the rectifier leg including element 27 so that half-cycle voltage pulses are applied to winding 31a on first alternate half-cycles of operation and to winding 29a on second alternate half-cycles of operation. Similarly, the voltage across terminals E—F is applied to the load windings 31b and 29b through a second bridge rectifier including elements 35, 39, 33 and 37. Winding 31b is in series with rectifier element 35, and winding 29b is in series with rectifier element 33 so that half-cycle voltage pulses are applied to winding 31b on second alternate half-cycles of operation and to winding 29b on first alternate half-cycles of operation. The variable impedance unit 12 is connected across the output of the control circuit bridge rectifier that includes the control windings, and a field winding 5 is connected across the output terminals 40b and 40a of the load circuit bridge rectifier that includes the load windings. In operation, the load windings are operative to saturate their respective cores in half-cycle alternation, the portion of each voltage pulse after saturation of a given core appearing across field winding 5 at the output terminals 40a and 40b of the magnetic amplifier 19. The control windings are operative to desaturate their respective cores also in alternation, the extent to which the cores are desaturated being an inverse function of the control circuit impedance of unit 12. The voltseconds required from a given pulse to saturate a given core is equal to the number of voltseconds in the voltage pulse applied to the control winding thereof on the immediately preceding half cycle of operation. Therefore the voltseconds in the output pulses applied to field 5 is directly variable with the impedance of unit 12.

Variable impedance unit 12 includes a plurality of series-connected resistance elements 17a, 17b, 17c, 17d and 17e; these resistance elements are adapted to be progressively short circuited by electromagnetic, finger-type shorting unit 6. This unit 6 may be of the type shown and described in Patent No. 2,550,779 to A. M. Cohen. In this type of unit, an armature 10 is actuated by solenoid 8 to raise a lifting bar 11. Under non-operating conditions this lifting bar 11 is biased to maintain a number of conductive, interconnected finger elements 15a, 15b, 15c, 15d and 15e respectively out of contact with contact points 16a, 16b, 16c, 16d, 16e and 16f. Across these contact points are the resistance elements 17a, 17b, 17c, 17d and 17e. As the lifting bar 11 is raised, the resistance elements are short circuited one by one and the total series resistance between terminals 18a and 18b of the resistance elements is decreased. The position of the armature 10 and lifting bar 11 is controlled by the current through solenoid 8, which current is supplied from the output terminals E—F of generator 3 through rectifier 4 and is proportional to the voltage across terminals E—F. The armature and lifting bar therefore can assume intermediate positions depending on the output voltage of the alternator thereby presenting intermediate output impedances to magnetic amplifier 19.

To prevent the current from alternator 1 to its load 62 from falling to such a low value under short circuit conditions that circuit breakers 61 and 63 are not actuated as will be occasioned by the very small output voltage and current available from magnetic amplifier 19 under such conditions, a current feedback loop is inserted between terminals A—B in series in one of the load lines of alternator 1 and to field coil 5. This feedback loop will provide field current proportional to the load current and includes current transformer 53 and bridge rectifier 40. The primary of the current transformer 53 is coupled to terminals A—B and its secondary is connected to input terminals 41 and 47 of rectifier 40, the output terminals of the rectifier being connected to field coil 5 at the output of the magnetic amplifier 19. The elements of rectifier 40 are preferably selenium rectifiers or like units capable of large current output.

The operation of the system is as follows. When the alternator is first started, sufficient magnetization is present in the field to produce a few volts across terminals E and F and thereby across C and D power terminals of the magnetic amplifier. Relay 75 is normally closed, so current is supplied to field 5 through bridge rectifier 65, thereby increasing the voltage developed by the alternator. The increased output voltage of alternator 1 results in greater current to field coil 5, which further increases the alternator voltage. The output voltage of the alternator thus builds up rapidly due to the regenerative increase of field current and output voltage. When the output voltage is sufficient to operate magnetic amplifier 19, relay 75 opens and disconnects rectifier 65 from field 5. Until the alternator reaches rated voltage shorting unit 6 is adjusted to be inoperative, so the impedance input to the magnetic amplifier is very high and the output current is likewise high.

Assume now that alternator 1 has reached its rated voltage and still tends to rise. This rise in voltage will cause an increase in current through solenoid 8, which now will move armature 10 upward. This movement will successively cause fingers 15e, 15d, 15c, etc. to engage contact points 16e, 16d, 16c, etc., and successively short circuit resistances 17a, 17b, 17c, 17d and 17e. The impedance across input terminals 18a and 18b of magnetic amplifier 19 will be lowered, effecting a decrease in the number of voltseconds in the output voltage pulses of the magnetic amplifier, and a smaller exciting current is thereafter applied to field 5. This decrease in exciting current will lower the voltage developed by winding 3, and the system will stabilize around an average voltage determined by the adjustment of shorting unit 6. When load is suddenly removed from the alternator, the voltage will again tend to rise, and the cycle of events described immediately above will ensue. Addition of load to the alternator will bring about a decrease in the load voltage and in the current through solenoid 8. Armature 10 is moved downward, increasing the input impedance to and the output current from the magnetic amplifier 19, thereby increasing the field current and generated voltage of the alternator 1.

Under short circuit conditions, the voltage across winding 3 will be suddenly lowered to a small fraction of its former value. Inasmuch as the output voltage of the magnetic amplifier will also be lowered, the magnetic amplifier may be unable to supply enough excitation current to raise the alternator voltage to a value sufficient to actuate circuit breakers 61 and 63. However, the large current through the primary current of transformer 53 will induce enough current in the secondary thereof to supply the field of the alternator through bridge rectifier 40. The polarity of output rectifiers 35 and 39 of magnetic amplifier 19 is such as to isolate the magnetic amplifier from any voltage developed by bridge rectifier 40. Likewise, the elements of bridge rectifier 40 are polarized so as to isolate transformer 53 from the voltage at the output of the magnetic amplifier.

It should be noted that the electromagnetic finger type units 6 covered by Cohen Patent No. 2,550,779 are commercially available in two embodiments, one type having the contact fingers in contact with the contact points under non-operating conditions as described in the patent. In the other type the fingers are maintained out of contact with the contact points under non-operating conditions and it is this type that obviously should be utilized in the present invention.

Thus it can be seen that there has been provided a voltage regulating system wherein components of the nature of a D. C. generator and carbon-pile regulator having large mechanical and electrical inertia have been eliminated. Likewise, the magnetic amplifier dissipates most of the power that is absorbed by the system, and the elements of the magnetic amplifier are of a nature not easily damaged by heat. The only moving element in the entire system is the shorting unit 6, and it is small, fast-acting and reliable in operation. As the alternator provides power for the magnetic amplifier and for the bridge rectifier coupled to transformer 53, the alternator effectively furnishes its own field excitation. All of the components are fast-acting, so correction is provided for alternator voltage variations with sufficient rapidity to prevent oscillations from occurring.

Although the embodiments disclosed in the preceding specification are preferred, other modifications will be apparent to those skilled in the art which do not depart from the scope of the broadest aspects of the present invention.

The invention described herein may be manufactured and used by or for the Government of the United States of America for governmental purposes without the payment of any royalties thereon or therefor.

What is claimed is:

1. A voltage regulator for an alternating current generator having a field winding comprising: magnetic amplifier means coupling the output of said generator to the field winding thereof, the output power from said magnetic amplifier being proportional to the input impedance thereof; a variable impedance element connected across the input of said amplifier; and means operative to vary said impedance inversely with variations of the peak output voltage of said alternating current generator.

2. A voltage regulator for an alternating current generator having a field winding comprising: magnetic amplifier means coupling the output of said generator to the field winding thereof, the output power from said magnetic amplifier being proportional to the input impedance thereof; a plurality of impedance elements series-connected across the input of said magnetic amplifier; and shorting means operable to short out an increasing number of said series-connected impedance elements with increase in average output voltage of said alternating current generator.

3. A voltage regulator for an alternating current generator having a field winding comprising: magnetic amplifier means coupling the output of said generator to the field winding thereof, the output power from said magnetic amplifier being proportional to the input impedance thereof; a plurality of impedance elements series-connected across the input of said magnetic amplifier; electromagnetically actuated means operable to short out an increasing number of said series-connected impedance elements with increase in average output voltage of said alternating current generator, a bridge rectifier the output of which is coupled across said field winding, and current transformer means coupled to the input of said bridge rectifier, the primary of said current transformer being connected in a line between said alternating current generator and its load.

4. A voltage regulator for an alternating current generator having a field winding comprising: magnetic amplifier means coupling the output of said generator to the field winding thereof, the output power from said magnetic amplifier being proportional to the input impedance thereof; a plurality of impedance elements series-connected across the input of said magnetic amplifier; electromagnetically actuated means operable to short out an increasing number of said impedance means with increase in average output voltage of said alternating current generator, a bridge rectifier the output of which is coupled across said field winding, current transformer means operative to supply current to said bridge rectifier proportional to the load current of said alternating current generator.

5. A voltage regulator for an alternating current generator having a field winding comprising: magnetic amplifier means coupling the output of said generator to the field winding thereof, the output power from said magnetic amplifier being proportional to the input impedance thereof; a plurality of impedance elements series-connected across the input of said magnetic amplifier; electromagnetically actuated means operable to short an increasing number of said impedance means with increase in average output voltage of said alternating current generator, a bridge rectifier the output of which is coupled across said field winding, current transformer means effective to supply current to said bridge rectifier proportional to the load current of said alternating current generator, and a second bridge rectifier effective to supply field current to said A. C. generator in proportion to the generated voltage of said A. C. generator, and means operative to prevent said second bridge rectifier from supplying current to said field winding when said generated voltage is greater than a given amplitude.

6. A voltage regulator for an alternating current generator having a field winding comprising: magnetic amplifier means operative to supply current to said field winding, the output voltage and current from said magnetic amplifier being proportional to the input impedance thereof; a plurality of impedance elements series-connected across the input of said magnetic amplifier; electromagnetically actuated conductive means operable to short an increasing number of said impedance means with increase in average output voltage of said alternating current generator; a bridge rectifier the output of which is coupled across said field winding, current transformer means effective to supply current to said bridge rectifier proportional to the load current of said alternating current generator; a second bridge rectifier effective to supply field current to said A. C. generator proportional to the generated voltage of said A. C. generator, and relay means operative to decouple said second bridge rectifier from said field winding when said generated voltage is greater than a given amplitude.

7. In an alternating current generator system having a field winding, a voltage regulator system comprising, a magnetic amplifier system adapted to couple the output of said generator to the field winding to control the excitation thereof, control circuit means responsive to the output voltage from said generator to change the power output of said amplifier in opposition to the change in output voltage from the generator, and current feedback means adapted to be coupled in series with the output of said generator for feeding back to the field winding thereof an additional excitation component in proportion to the output current drawn from said generator.

8. In an alternating current generator system having a field winding, a voltage regulator system comprising, a first feedback path between the output of said generator and the field winding operable to produce voltage build up in the output of the generator, means decoupling said first feedback path upon the attainment of a predetermined voltage output from said generator, a magnetic amplifier system adapted to couple the output of said generator to the field winding to control the excitation thereof, and control circuit means responsive to the output voltage from said generator to change the power output of said amplifier in opposition to the change in output voltage from the generator.

9. A voltage regulator for an alternating current generator having a field winding comprising, magnetic amplifier means coupling the output of said generator to the field winding thereof, the output power from said magnetic amplifier being proportional to the input impedance thereof, a variable impedance element connected across the input of said amplifier, means coupled to the output of said generator operative to vary said impedance inversely with variations in the output voltage from said generator, and current feedback means coupled in series with the output of said generator for feeding back to the field winding thereof an additional excitation component in proportion to the output current drawn from said generator.

References Cited in the file of this patent

UNITED STATES PATENTS

| | | |
|---|---|---|
| 2,111,408 | Schroter | Mar. 15, 1938 |
| 2,161,179 | Logan | June 6, 1939 |
| 2,165,976 | Maudl | July 11, 1939 |
| 2,208,416 | Friedlander et al. | July 16, 1940 |
| 2,238,611 | Tittel | Apr. 15, 1941 |
| 2,262,359 | Exner | Nov. 11, 1941 |
| 2,363,857 | Crever et al. | Nov. 28, 1944 |
| 2,550,779 | Cohen | May 1, 1951 |
| 2,571,827 | Bradley | Oct. 16, 1951 |
| 2,631,268 | Ransom et al. | Mar. 10, 1953 |

OTHER REFERENCES

Transactions A. I. E. E., vol. 70, part II, pages 1214 to 1223.